Figure 1:
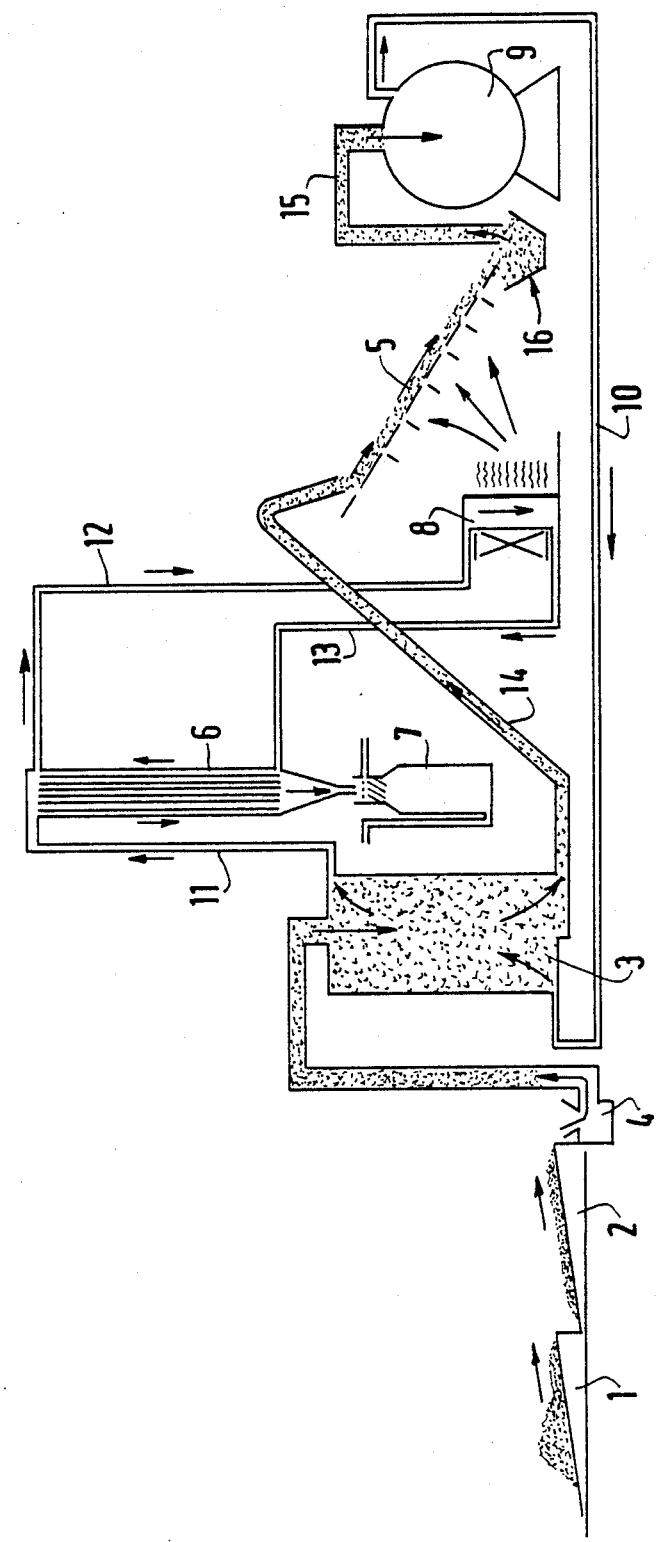

United States Patent [19]

Coutiere

[11] Patent Number: 4,935,104
[45] Date of Patent: Jun. 19, 1990

[54] PROCESS FOR THE CONTINUOUS HYDRO-DISTILLATION OF PLANTS

[75] Inventor: Dominique Coutiere, Labrit, France

[73] Assignee: Biolandes, Landes, France

[21] Appl. No.: 120,381

[22] Filed: Nov. 13, 1987

[30] Foreign Application Priority Data

Oct. 19, 1987 [FR] France ............... 8714353

[51] Int. Cl.$^5$ ............................................. B01D 3/38
[52] U.S. Cl. .................................... 203/85; 203/25;
203/27; 203/95; 203/DIG. 8; 203/DIG. 25;
202/106; 202/170; 202/172; 202/176;
202/185.3; 202/234; 260/412; 260/428;
424/196.1; 426/489

[58] Field of Search .................. 203/25, 27, DIG. 8,
203/DIG. 11, DIG. 25, 95, 92, 96, 99, 85, DIG.
7; 202/176, 234, 185.3, 172, 170, 94, 106;
426/489, 624, 623, 635, 636; 424/195.1, 196.1;
260/412, 420, 428; 512/5; 44/1 D, 1 E, 1 F;
159/43.2, DIG. 41

[56] References Cited

U.S. PATENT DOCUMENTS

| | | | |
|---|---|---|---|
| 515,889 | 3/1894 | Todd | 202/170 |
| 589,000 | 8/1897 | Krebs | 202/234 |
| 773,139 | 10/1904 | Gesner | 202/234 |
| 808,035 | 12/1905 | Gardner | 202/234 |
| 832,863 | 10/1906 | Kerr | 202/234 |
| 847,676 | 3/1907 | Mackethan | 202/234 |
| 1,103,878 | 7/1914 | Hillard | 202/234 |
| 2,424,824 | 7/1947 | Hermo et al. | 202/234 |
| 3,827,946 | 8/1974 | Grimmett et al. | 203/25 |
| 4,292,140 | 9/1981 | Kawasaki et al. | 203/27 |
| 4,406,745 | 9/1983 | Martel | 202/175 |

FOREIGN PATENT DOCUMENTS

WO83/00007  1/1983  PCT Int'l Appl. ............... 426/624

Primary Examiner—Wilbur Bascomb
Attorney, Agent, or Firm—Fleit, Jacobson, Cohn, Price, Holman & Stern

[57] ABSTRACT

The invention provides a process for producing essential oils by plant hydro-distillation including the following steps:
(a) loading the plants continuously into a still where they are processed counterflow wise with steam,
(b) continuous unloading of the exhausted plants,
(c) recovery of the latent heat of distillation and condensation of the steam by means of a gas in a condenser,
(d) drying of the exhausted plants by contacting with the gas, in a drying installation,
(e) combustion of at least a part of the dried exhausted plants in a boiler and use of the combustion heat for producing steam.

8 Claims, 2 Drawing Sheets

PROCESS FOR THE CONTINUOUS HYDRO-DISTILLATION OF PLANTS

The present invention relates to the hydrodistillation of plants for the production of essential oils. Known plant hydrodistillation processes, consisting in extracting the essential oils by the use of steam, are at present worked discontinuously, the still being loaded periodically with fresh plants after removal of the exhausted load. Furthermore, existing processes only make possible a partial recovery of the energy supply and their implementation requires considerable manpower as well as long processing times.

The applicant has therefore sought to overcome these drawbacks by ensuring the best possible efficiency with an operating plan making it possible:

to process large amounts of plants in a relatively short time, to reduce the manpower costs related to excessive handling, to ensure energy independence of the assembly, and to make good use of the distillation residues.

Thus a process has been perfected in which loading and unloading of the plants take place continuously, which makes automation thereof possible and so provides considerable saving in manpower as well as a very good reproductibility.

The invention relates then to a process characterized in that it comprises the following steps:

(a) loading the plants continuously into a still where they are processed counterflow wise with steam, (b) continuous unloading of the exhausted plants, (c) recovery of the latent heat of distillation and condensation of the steam by means of a gas, (d) drying of the exhausted plants by contacting with the gas, (e) combustion of at least a part of the dried exhausted plants and use of the combustion heat for producing steam.

The invention also provides an appropriate apparatus for its implementation formed of a hydrodistillation unit and a latent distillation heat recovery device.

In a preferred embodiment of the invention, steam processing takes place in two stills operating alternately for loading-unloading and distillation, which improves the hourly yield of the process. Before penetrating into the still the product, generally precrushed, is thrown into high capacity moving bottoms, then recrushed so as to be able to be processed continuously, crushing accelerating the extraction of the essential oils. Preferably, the plants are reduced to a strand size between 2 and 5 cm.

The continuous running of the process makes it possible to process the plants immediately after crushing, which avoids fermentation which is set off fairly rapidly, altering and modifying the composition of the essences.

As was mentioned above, one of the purposes of the invention is also to ensure the energy independence of the process. In known processes the vapor plus essential oil mixture is condensed in worms cooled by considerable amounts of cold water, with obviously loss of the latent heat.

The method of the invention recovers this latent heat by the use of a gas, preferably air, which then serves for drying the exhausted plants, making possible a satisfactory combustion thereof.

This condensation system has the advantage of eliminating the considerable cold water requirements of the prior technique and in making possible complete energy independence of the hydro-distillation. It even makes it possible to make use of the energy of the residue which may be used as a fuel outside the process. This additional yield may prove important in the case where the processed plants lead to considerable excess volumes of residue not used for the energy of the process, which is the case of ligneous plants with a high proportion of wood such as conifers, particularly the maritime pine, and the eucalyptus. Furthermore, the dried exhausted plants may be used as animal food providing a complement of cellulose particularly for ruminants.

The invention will be better understood from reading the following description of one embodiment with reference to the accompanying drawings in which:

FIG. 1 shows the overall plan of the process, and

FIG. 2 explains the alternate operation used in an installation with two stills.

Referring to FIG. 1, the green plant material is fed into a first hopper with rapid moving bottom 1 for unloading and then passes into a second hopper with slow moving bottom 2 controlled by a microprocessor for the still or stills 3. The material then passes, if required, into a crusher 4 which reduces it to the appropriate strand size. It is then fed into the still by an automated loading-unloading system making possible continuous processing of the plants, such as the device described in patent application No. FR-87114354 filed on the 19 Oct. 1987. The steam is fed by means of the steam line 10; into the still in regulated amounts and counterflow wise with respect to the crushed plants which are continuously removed by an unloading device from the bottom of the still, such as an endless screw 14, and fed to the drying installation 5.

The steam and oil mixture is discharged through the vapor line 11 from the top of the still and passes into a condenser 6 and then into a separator 7 in which the oil phase is separated from the aqueous phase. A unit heater 8 swept by a calculated air flow causes steam at 100° C. discharged from the condenser 6 through loop 12 to the unit heater 8 to be transformed into water at 100° C. The water at 100° C. is then cooled to water at 20° C. bypassing through a worm. The air thus is heated to a temperature of the order of 40° to 60° C. and is fed to the drying installation 5 for obtaining dry material. If required, a second unit heater can be provided behind the first one, for increasing the temperature of the air up to 90° C. for example. Dry material is discharged in hopper 16.

Figure 2A:
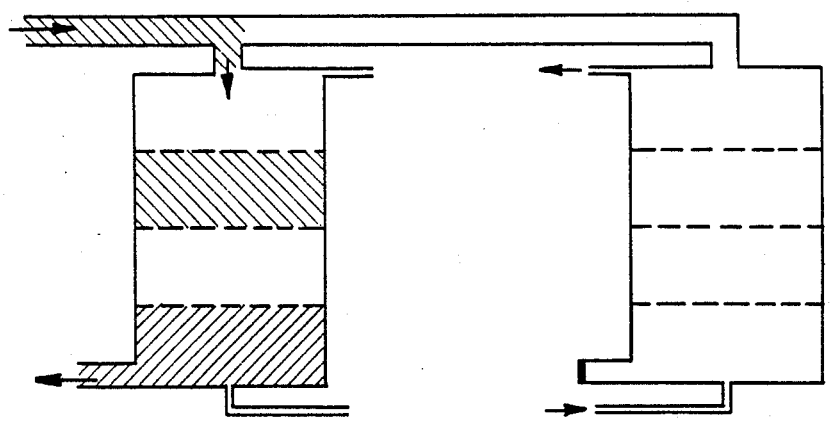

A part of or if necessary the whole of this dry material is burnt in a boiler 9 for example a screw boiler. In the case of a very ligneous product, such as pine which is fed by mean of the feeding device 15 sucking dry material from hopped 16; for example, only a third of the plant material extracted is used in the boiler for supplying the energy required for distillation. The excess dry material fraction is available for use, as mentioned above, as a fuel or as a food complement for animals. It can be withdrawn from hopper 16. Referring to FIG. 2, where the greyish areas represent plant material, the operation with two stills can be detailed as follows:

FIG. 2a: spent plant material is unloaded from the first still which is then loaded with the fresh plant material while the second still is operated with steam flow for extraction.

Figure 2B:
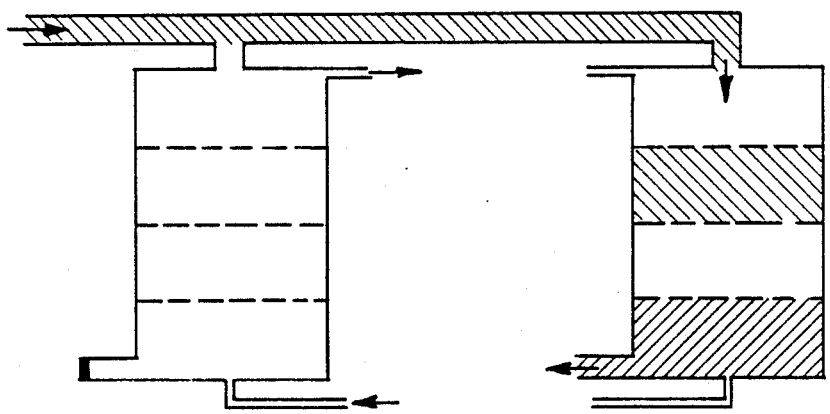

FIG. 2b: the first still is operated with steam flow for extraction, while the second still is first unloaded before reloading with fresh plant material.

Figure 2C:
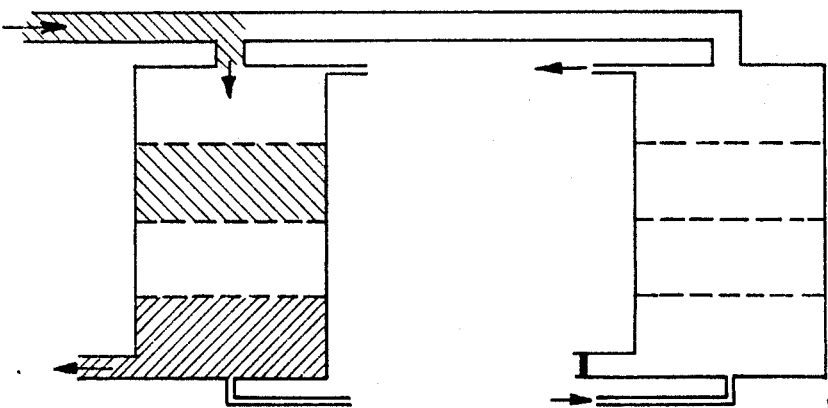

FIG. 2c: is identical to FIG. 2a to show the cycle for operating the two stills. The following example illustrated the invention without however limiting the scope thereof.

EXAMPLE

Maritime pine, crushed to a strand size of about 3 to 4 cm is fed by the slow moving bottom hopper 2 at a rate of 1.5 t/h of green material (that is to say containing 50% of dry material and 50% water). This crushed pine is processed in a still of a useful capacity of 7.5 m$^3$. The stay time therein is 2½ hours, the steam being injected at the rate of 500 kg/h. The amount of liquid leaving the condenser 6 is 165 1/min.

For 1.5 t of crushed pine, 2.1 kg of essential oil is recovered having the following characteristics:

| | |
|---|---|
| Density at 20° C. | 0.869 to 0.872 |
| Refraction index | 1.475 to 1.482 |
| Rotary power | −25°50′ |
| ESTER index | 3.6 to 8 |
| Acid index | 0.4 to 0.7 |
| Solubility in alcohol at 90° | 1 volume in 3 and more |

Compared to known processes, the invention makes it possible to process in a very short lapse of time a large amount of plants, for example 1 to 2 t/h in each still, practically without labour, in a very steady way and providing essential oils of constant quality because of the homogeneity of the processing conditions.

The invention may be used for all ligneous and non ligneous plants, used as raw material for the production of essential oils. It applies in particular to conifers, such as the maritime pine, eucalyptus, herbaceous shrubs and plants, particularly tarragon, basil, rosemary, juniper, thyme, mint, mosses as well as bark and sawdust. The yield may reach and even exceed 80% whereas in traditionally used processes the yield is of the order of 20%.

I claim:
1. A process for producing essential oils by plant hydrodistillation comprising the following steps:
   (a) loading plants continuously into a distillation unit and passing steam in a countercurrent flow direction to the plants through the length of the distillation unit to produce a stream of steam and vapor mixture;
   (b) continuously unloading the exhausted plants;
   (c) recovering the latent heat of condensation of the steam and vapor mixture and using the recovered latent heat to heat air in a heat recovery device comprising a closed loop transferring the latent heat to an air heater;
   (d) drying at least a portion of the exhausted plants by contacting them with the air exhausting from the air heater; and
   (e) combusting at least a part of the dried exhausted plants and using the combustion heat for producing steam.

2. Process according to claim 1 wherein the plants are in the form of strands the length of which is between 2 and 5 cm.

3. Process according to claim 2 wherein the plants are crushed before processing and immediately loaded in the distillation unit.

4. Process according to claim 1 wherein distillation is conducted in a distillation unit consisting of two stills operating alternately for plant loading/unloading and for steam passing, said stills being arranged in parallel with respect to the steam flow.

5. Process according to claim 1, wherein the separation of essential oils is carried out by decantation of the condensed steam and vapor mixture.

6. Process according to claim 1, wherein the plants are ligneous plants.

7. Process according to claim 6, wherein the ligneous plants are selected from the group consisting of conifers and eucalyptus.

8. Process according to claim 7, wherein the ligneous plants are the tops of maritime pines.

* * * * *